Aug. 21, 1934.  E. CHRISTIANSEN  1,971,129
VARIABLE SPEED FRICTION GEAR
Filed July 13, 1933

E. Christiansen
INVENTOR

By CA Snow & Co.
ATTORNEYS.

Patented Aug. 21, 1934

1,971,129

UNITED STATES PATENT OFFICE 1,971,129

VARIABLE SPEED FRICTION GEAR

Ejnar Christiansen, Birmingham, England

Application July 13, 1933, Serial No. 680,315
In Great Britain July 20, 1932

2 Claims. (Cl. 74—200)

This invention comprises certain improvements in or relating to friction gears of the type comprising a box in bearings on the opposite walls of which are mounted two spindles slidably carrying on their inner ends face friction discs which are spring pressed inwardly against an intermediate friction wheel or wheels.

According to the present improvements, one face friction disc is, in an improved manner, movable endwise out of engagement with the intermediate friction wheel or wheels to thereby constitute a clutch member for disconnecting the drive. A face friction disc is slid on the spindle out of contact with the intermediate friction wheel or wheels by means of a control member which applies pressure to the friction disc boss at a part located in the box. For this purpose the face friction disc is moved through the medium of a control member which passes centrally through the shaft on which the face friction disc is mounted, and such control member is connected to the inner end of the boss on the face friction disc. By this invention also the face friction members are mounted to have a free endwise sliding movement by the application of grease to the sliding surface, and means are provided for ensuring that the grease will not enter the box enclosing the friction members. For this purpose caps are fitted on the inner ends of the bosses of the face friction discs; and one of the caps is utilized for connecting the aforementioned control member to the face friction disc.

Referring to the drawing.

Figure 1:
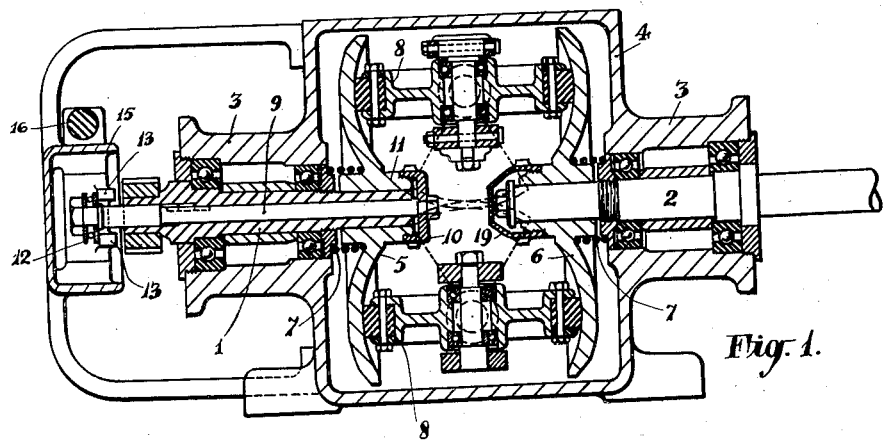
Figure 1 is a central cross sectional elevation of a gear box constructed according to this invention.
Figure 2:
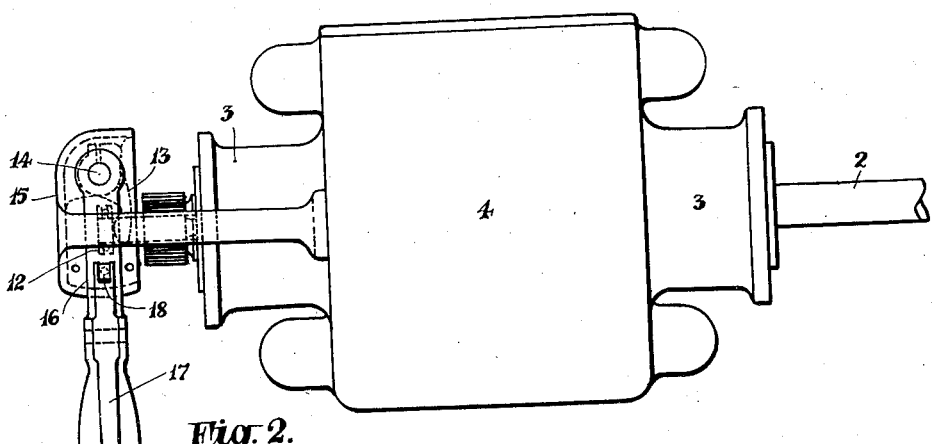
Figure 2 is a plan view of Fig. 1.
Figure 3:
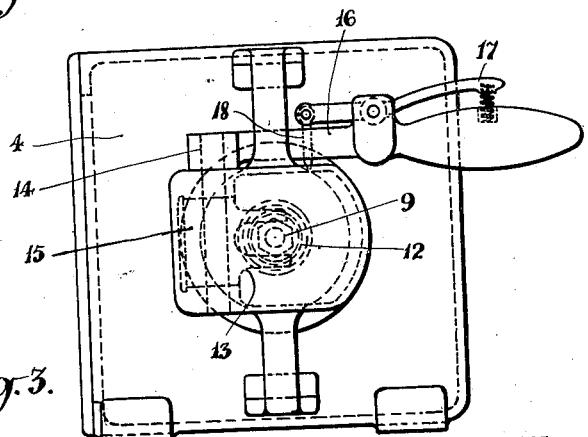
Figure 3 is an end view of Fig. 1.

According to one form of the invention, two spindles 1 and 2 are mounted, respectively, in ball bearings carried by bosses 3 on opposite walls of a friction box. The ends of these spindles located inside the box 4 have face friction discs 5 and 6 slidably mounted thereon and urged inwardly by means of spiral springs 7 to bear against two intermediate friction wheels 8. The interior of the friction box is entirely closed to exclude oil or other foreign matter which would detrimentally affect the friction surface of the gear members. With this particular form of box the face discs are mounted on the inner end of the spindles projecting inside the box, and difficulty has been experienced in devising means whereby the friction members may also be utilized as a clutch. According to the present improvements, in the form shown by Figures 1 to 3, this difficulty is overcome by boring a hole in the spindle 1 and mounting an inner spindle 9 therein to form a control member. The inner end of this control spindle 9 is fixed to a member or cap 10 which is also fixed to the boss 11 of the face friction disc slidably mounted on the hollow spindle. The outer end of the control spindle 9 projects beyond the end of the outer concentric spindle extending through the wall of the gear box. An end thrust bearing 12 is mounted on the outer end of the control spindle and a pivot control fork 13 is adapted to bear against the thrust bearing in order to move the inner spindle endwise and consequently also the face friction member. A fork 13 is mounted on a spindle 14 mounted in the bracket 15 fixed to the box 4. An arm 16 is fixed to the top of this spindle such arm carrying a spring controlled catch member 17 having a pin 18 at one end for engaging a perforation in the bracket 15 for holding the gear in the declutched position.

It has been found that as grease must be prevented from entering the interior of the friction box the sliding surface of the face friction members and the spindles on which they are mounted have a tendency to become set when the gear has been in use for some considerable time, and by this invention also means are provided to obviate this defect. Grease is applied to the said sliding surfaces but in order to prevent any grease entering the box, caps 10 and 19 are mounted on the inner ends of the bosses of the face friction discs. These caps completely enclose therefore the ends of the spindles and will consequently prevent any grease entering the friction box. One of these caps 10 form the means of connecting the aforementioned control spindle to the face friction disc, and conveniently the end of the inner spindle is shouldered down and is passed through a perforation in the centre of the cap which is secured thereto by means of a nut.

By the aforedescribed construction a friction box with the declutching mechanism forms a self contained unit.

What is claimed is,

1. A variable speed friction gear comprising a box completely enclosing the friction members, bearings in opposite walls, spindles passing through the bearings to project inside the box, a face friction disc slidably mounted on each spindle, an intermediate wheel or wheels mounted between the face friction discs, springs located in the box and pressing the face friction discs against the intermediate friction wheel or wheels, a control rod slidably mounted in a bore in one of said spindles, a boss on one of the face friction discs which projects beyond the end of the shaft on which it is mounted, a cap on the inner end of the boss which forms an oil seal and to which the inner end of the control rod is connected, the arrangement being such that the control rod, spindle and face friction disc rotate as a unit, and means connected to the end of the control rod located outside the gear box for sliding the control rod to move the aforementioned face friction disc out of engagement with the intermediate friction wheel or wheels.

2. A variable speed friction gear comprising a box completely enclosing the friction members, bearings in opposite walls, spindles passing through the bearings to project inside the box, a face friction disc slidably mounted on each spindle, an intermediate wheel or wheels mounted between the face friction discs, springs located in the box and pressing the face friction discs against the intermediate friction wheel or wheels, a control rod slidably mounted in a bore in one of said spindles, a boss on one of the face friction discs which projects beyond the end of the shaft on which it is mounted, a cap on the inner end of the boss which forms an oil seal and to which the inner end of the control rod is fixed so that the control rod, spindle and face friction disc rotate as a unit, a bracket carried on the box, a thrust bearing on the end of the control rod, a fork pivoted on the said bracket engaging an annular groove in the bearing and adapted to move the control rod endwise to move the aforementioned face friction disc out of engagement with the friction wheel, and a spring catch for holding the control rod in the withdrawn position.

EJNAR CHRISTIANSEN.